T861,003

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 1, 1969

861 O.G. 17

758,649

PROCESS FOR PREPARING POLYMER PARTICLES OF 2–10 MICRONS

Francis E. Jenkins, Wilmington, Del., assignor to E. I. du Pont de Nemours and Company, Wilmington, Del., a corporation of Delaware

Continuation of application Ser. No. 546,187, Apr. 29, 1966. This application Aug. 19, 1968. Published Apr. 1, 1969

Class 260—89.5

No Drawing. 12 Pages Specification

A process for forming polymeric synthetic polymeric particles that have a particle diameter within 2–10 microns by (1) adding an electrolyte to a latex having a polymer particle size of 0.001–1 micron to form a thixotropic latex; (2) forming an organic dispersion by adding a polymer non-solvent to the thixotropic latex; and (3) drying the organic dispersion to form finely divided synthetic particles having a diameter within 2–10 microns.